Figure 5:
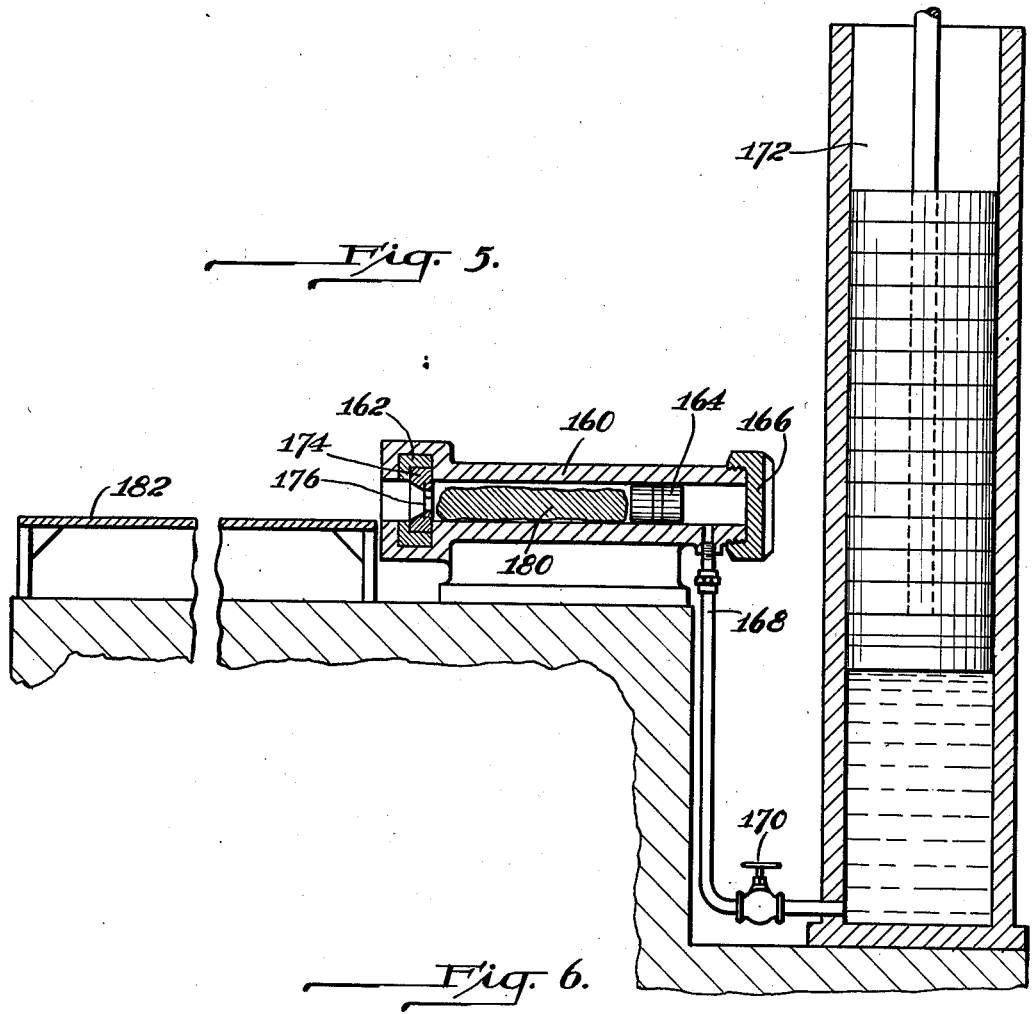

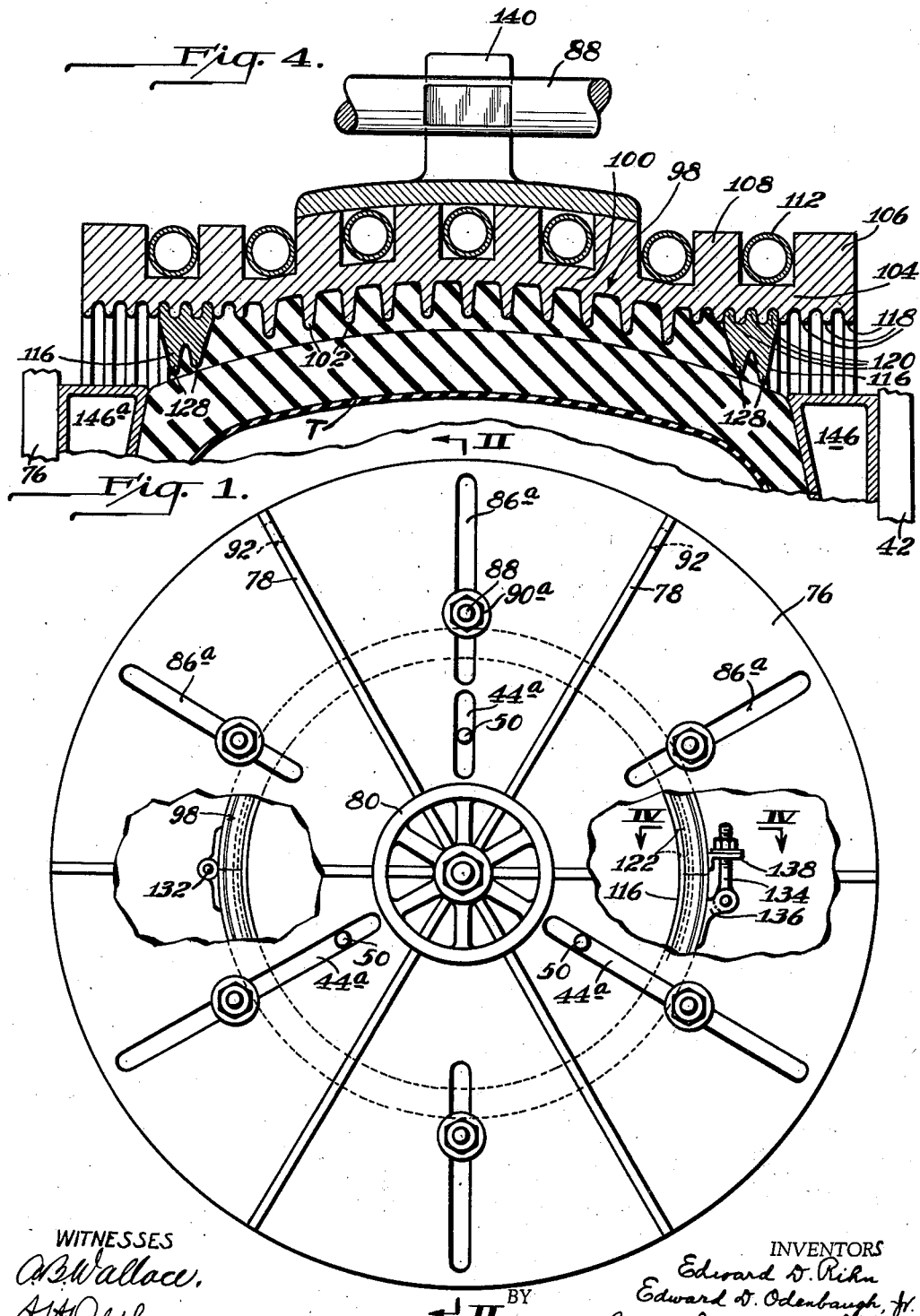

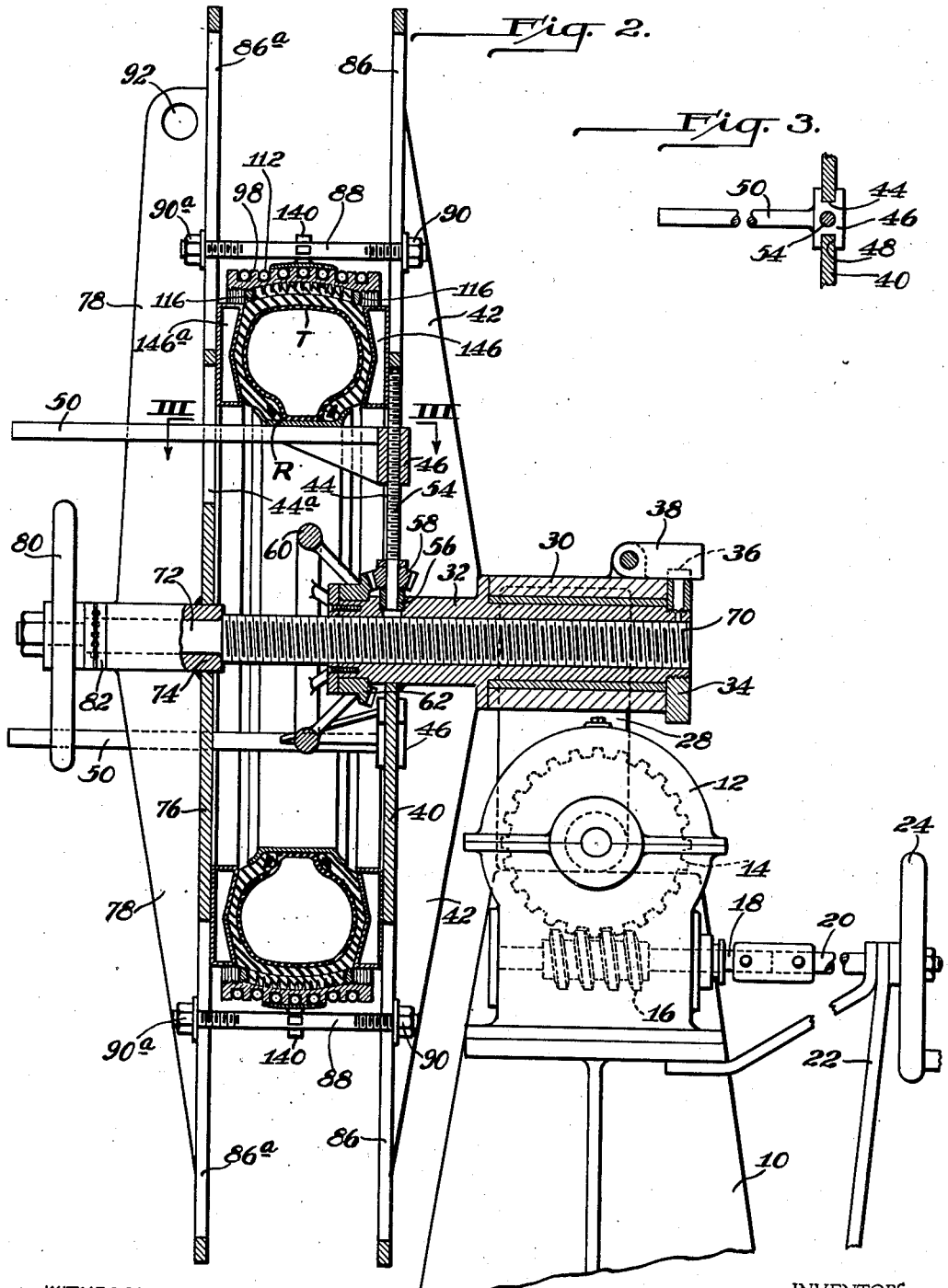

Patented Apr. 25, 1939

2,155,906

UNITED STATES PATENT OFFICE 2,155,906

VULCANIZER

Edward D. Rihn, Ford City, and Edward D. Odenbaugh, Jr., Wilkinsburg, Pa., assignors, by mesne assignments, to Clark E. Gross Application January 4, 1936, Serial No. 57,578

12 Claims. (Cl. 18—18)

This invention relates to vulcanizers, and more particularly to apparatus for retreading pneumatic tires and to the mold incorporated therein and the method of making the mold.

Prior to our invention various methods and apparatus have been suggested and used with greater or less success in retreading pneumatic tires. We have found, however, that prior methods and machines have been open to criticism and have encountered difficulties due chiefly to the following factors:

(a) The inability of the apparatus and methods to adapt themselves to handle tires of different size and conditions of wear. This has meant that the retreading and vulcanizing shop has had to carry a large quantity of molds which for a satisfactory job could be used only to retread a definite size tire with a certain condition of wear;

(b) The high initial cost of the equipment for even a small retreading plant and the cumbersomeness of the vulcanizers requiring hard physical work and high labor costs;

(c) Inability of the apparatus to properly vulcanize the new tread in place without overheating or overvulcanizing portions of the whole carcass;

(d) Failure of prior known methods and mechanism to provide a uniform high grade retreaded tire. By this is meant that no two retreaded tires were alike even though the same size apparently having the same conditions of wear were vulcanized in similar mold equipment. The result has been an unbalanced tire of non-uniform appearance.

All of the foregoing factors have contributed to keeping the cost of retreading a tire relatively high so that as compared with the price of a new tire many people believe it cheaper to purchase the new tire. In certain instances this is probably the best procedure but a sound tire carcass with a high grade retreading job thereon but at less cost than now prevails should meet with widespread commercial success.

Accordingly the general object of our invention is to avoid and overcome the foregoing and other difficulties of prior art practices and apparatus used for retreading tires by the provision of apparatus adapted to retread a plurality of sizes of pneumatic tires in a highly satisfactory manner with a minimum of labor requirements whereby the average cost of retreading is considerably reduced.

More specifically it is an object of our invention to provide a mold stand adapted to receive substantially any mold size with the molds of the different sizes each being adapted to handle a plurality of tire sizes.

Another object of our invention is the provision of an improved rubber vulcanizing mold manufactured in a new and novel manner which materially reduces the cost thereof and at the same time results in a mold of superior characteristics.

A further object of our invention is to provide a mold for retreading pneumatic tires having incorporated therewith removable side rings which are adjustably associated with the mold proper in such a manner that they can be positioned substantially at the shoulders of a tire fitting in the mold which thereby adapts the assembly to tires of different tread widths and even diameters as hereinafter more fully described.

Another object of our invention is to provide relatively inexpensive and efficient apparatus which can be used to set up a tire retreading shop with a minimum of investment without sacrifice of the maintenance of high quality of product produced and tire sizes handled.

The foregoing and other objects of our invention are achieved by the provision of a vulcanizer for retreading pneumatic tires which comprises radially adjustable clamping means for supporting the tire through its rim with laterally adjustable side plates having associated water jackets for contacting with and supporting the tire sides. Surrounding the tread portion of the tire is a mold having side rings associated therewith substantially at the shoulders of the tread to be applied and extending approximately into contact with the tire carcass. The side rings are so mounted that they can be adjusted to a plurality of lateral positions relative to the mold whereby a plurality of tire sizes can be handled in one mold assembly.

The improved mold and method of making it comprising a part of our invention briefly consists of an extruded aluminum alloy section bent into circular mold shape. The aluminum alloy is extruded through a die of the desired contour under very high pressures and the resulting section not only possesses good heat-transmitting characteristics and surface finish but is much cheaper to make than rolled, cast or machined mold members such as heretofore employed.

Figure 6:
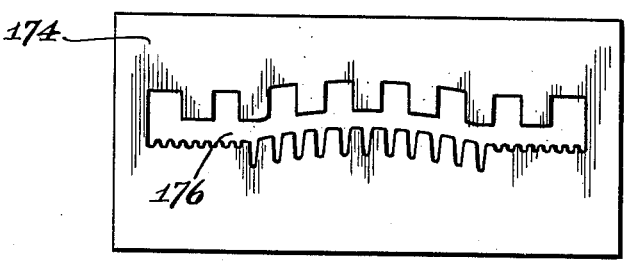

For a better understanding of our invention reference should be had to the accompanying drawings, in which Fig. 1 is a front elevation of one embodiment of apparatus incorporating the principles of our invention; Fig. 2 is a vertical cross-sectional view taken on line II—II, Fig. 1;

Fig. 3 is a horizontal cross-sectional view of a detail of the apparatus taken on line III—III of Fig. 2; Fig. 4 is an enlarged view of the tire and mold assembly shown in Fig. 2; Fig. 5 is a vertical cross-sectional view through apparatus diagrammatically illustrating the manufacture of the improved mold section of our invention; and Fig. 6 is an elevational view on a larger scale of a typical die employed in the apparatus of Fig. 5 for the manufacture of the mold section of our invention.

In the referred-to drawings the numeral 10 indicates a base supporting a gear housing 12 which contains a worm-gear 14 whose position is controlled by a worm 16 secured to a shaft 18 which is connected by a relatively long rod 20 journaled in brackets 22 to a hand-wheel 24. The worm-gear 14 is fastened to a bracket 28 which supports the vulcanizer proper so that operation of the hand-wheel 24 swings the bracket 28 and its associated vulcanizer from the vertical to the horizontal or vice versa.

The bracket 28 is formed with an integral hub 30 which journals a hollow shaft 32 which is secured therein as shown in Fig. 2 by a nut 34. The nut 34 is formed at its periphery with a plurality of notches 36 which cooperate with a pivoted latch 38 so that the rotatable shaft 32 can be fixed in any angular position, or, if desired, the latch 38 can be swung out of the way to leave the shaft free to rotate.

Secured upon the hollow shaft 32 is a circular plate 40 which is provided with radially extending strengthening webs 42. The plate 40 is formed with radially extending slots 44 which slidably receive brackets 46 formed with grooves 48 at their sides which receive the edges of the plate 40 forming the sides of the slot 44. The brackets 46 carry laterally extending arms 50 which serve to center the tire assembly in the apparatus as hereafter described.

The position of the brackets 46 in the slots 44 is controlled by the provision of radially extending screws 54 which have threaded engagement with the brackets 46 and which are journaled at their inner ends in suitable bushings 56 carried by the hollow shaft 32. In order to rotate the screws 54 a bevel gear 58 is fixed to each and a hand-wheel 60 is journaled on the end of the shaft 32 and is provided with a gear 62 which engages with the bevel gears 58. By this mechanism relative rotation of the hand-wheel 60 and the shaft 32 moves the arms 50 in and out upon the screws 54 as will be understood.

The interior of the hollow shaft 32 is threaded and receives the threaded shaft 70 which is formed at its outer end with a reduced portion 72 which rotatably carries a hub 74 to which is welded or otherwise fixed a second circular plate 76 also formed with radially extending strengthening flanges 78. The extension 72 of the threaded shaft 70 has a hand-wheel 80 fixed thereto and a thrust bearing 82 is provided between the hand-wheel 80 and the hub 74 of the circular plate 76.

The circular plate 76 is, like plate 40, formed with radially extending slots 44a to receive arms 50. Likewise both plates are formed with radially extending slots 86 and 86a which cooperate to receive laterally extending bolts 88 provided with nuts 90 and 90a which engage with the outsides of the plates to hold them in vulcanizing position. The radially extending slots 44, 44a, 86 and 86a also permit the operator to look through the side plates 40 and 76 at the tire and associated mold parts to make sure the assembly is properly set up. To facilitate handling of the outer circular plate 76, two of the radially extending strengthening flanges 78 are formed with openings 92 whereby the whole plate when removed can be readily picked up by a crane hooked in the openings.

In the drawings the letter T has been used to identify the pneumatic tire and associated inner tube or air-bag incorporated therewith in the retreading of the tire. The tire is mounted upon its usual metal rim marked R, or, if desired, a set of standard rims of the necessary sizes may be part of the vulcanizing equipment. With the tire mounted upon its rim and with the air-bag or inner tube therein, the assembly is carried by the arms 50. Surrounding the tire tread is the retreading mold generally indicated by the numeral 98, which, as better shown in Fig. 4, comprises a curved base portion 100 formed with inwardly extending flanges or ribs 102 and with relatively flat laterally extending portions 104 terminating in side flanges 106. For heating the mold to vulcanizing temperature we preferably secure a plurality of tubes 112 on the back of the mold which tubes are connected by suitable conduits (not shown) to any suitable source of steam, hot water or other vulcanizing fluid. To strengthen the structure and prevent the tubes 112 from injury spaced flanges 108 may be formed integrally with the mold.

While we preferably pass the vulcanizing fluid directly through the tubes 112, we contemplate also forming the mold 98 with a relatively wide flat chamber for receiving the vulcanizing fluid or securing to the mold a backing member containing a vulcanizing chamber. In all events the chamber is, of course, connected to conduits (not shown) for conveying the vulcanizing fluid to the apparatus by any suitable swivel or flexible connections which are well known and therefore not illustrated or described in detail.

A very important feature of the invention is the provision of adjustable side rings with the main base mold. As illustrated in Fig. 4, side rings 116 are associated with the base mold with means being provided for adjustably securing the rings in any of a plurality of lateral positions. These means may, of course, take a plurality of forms, but we have found the structure illustrated in Fig. 4 particularly advantageous. This structure includes the provision of a plurality of locking ribs 118 formed in parallel circumferential relation upon the side portions 104 of the base mold. The side rings 116 are likewise formed with spaced ribs 120 which fit in the grooves between any of the ribs 118. The side rings 116 are made split and with a tongue and groove connection indicated at 122 between their ends with the rings constantly tending to spring to a larger diameter. Thus the side rings may be circumferentially compressed and placed inside the side portions 104 of the base mold and into cooperation with the ribs 118 which position the side rings in the desired lateral relation. The side ring will then expand so as to bring its ribs 120 into snug fitting relation between the ribs 118 which hold the side rings firmly in place.

In another manner of practicing our invention the side rings 116 may be formed so that they constantly tend to contract to their smaller circumference. In using this type of side ring, the side ring is placed over the pneumatic tire before it is inflated in the mold so that upon inflation of the tire the ring is expanded outwardly into locking relation with the base mold.

The radial thickness of the side rings 116 may be varied by providing rings of several different thicknesses but of the same outside diameter. This may be done inasmuch as it is the purpose of the side rings to confine the retread rubber at the shoulders of the tire carcass, and to satisfactorily perform this purpose the side rings should extend substantially or approximately into engagement with the carcass of the tire.

There will be a slight rubber fin formed by the side rings in the retread due to the openings in the side rings formed by the tongue and groove connections 122. This relatively thin and short rubber portion could be readily cut or buffed from the tread after vulcanization, but we contemplate providing say five other thin openings in the side surfaces of the side rings at circumferentially spaced points on the ring which will give a balanced appearance to the vulcanized tread in that some six relatively thin and circumferentially short raised ribs of rubber will be formed about the circumference of the tread.

The radially inner face of the side ring can be made of any desired configuration which will perform the desired operation, and a typical shape is indicated in Fig. 4 as including a pair of raised ribs 128 with suitable transverse slots being cut in the inboard rib if necessary or desirable to allow for flow of rubber between the ribs.

The mold 98 may be made endless and with any desired contour or surface design therein. However, we have found that the operation of the apparatus and the performance of our method is facilitated by making the mold split, and this is our preferred practice. As shown in Fig. 1, the mold 98 may be split into two parts, having a hinge 132 at one side and a take-up bolt 134 at a diagrammatically opposite split or if desired take-up bolts at both splits. The take-up bolt 134 in its simplest form comprises an eye-bolt pivotally secured to a bracket 136 fastened to one end of the mold with a forked bracket 138 being fastened to the other mold end for the reception of the eye-bolt 134.

No means have been illustrated for connecting the tubes 112 of the parts of the mold 98 together if they are split as described just above, since these means may be any standard flexible or swivel connections of known character. Likewise it is unnecessary to employ such means if the mold is only split in one place rather than two as shown, or if the mold is used as an endless member.

To further assist in holding the mold 98 in exactly the position desired and to likewise prevent the bolts 88 from turning during the tightening of nuts 90 and 90a, the mold 98 is formed with a radially extending forked bracket 140 adjacent each bolt 88 which fits over a flattened spot in each bolt 88 so that the bolt is prevented from turning and so the mold is supported by the bolt.

In many of the prior known types of retread vulcanizers the vulcanizing of the tread has damaged the carcass of the tire due to overheating or overvulcanizing it. Accordingly in our apparatus we incorporate with the side plates 40 and 76 water jackets 146 and 146a which, as seen in Fig. 2, are adapted to fit against and closely support the side walls of the tire during retreading. The water jackets are generally formed upon independent supporting plates which are not permanently fastened to the front and back plates 40 and 76. Various size water jackets should be kept in the shop to use in vulcanizing tires of different size. It is also possible to dispense with the use of water jackets and the circulation of cooling fluid therethrough when tires of large size are retreaded. This is because the vulcanizing heat does not seriously affect the larger size tires. However, even in handling large size tires some means similar in contour to the water jackets are ordinarily employed to support the sides of the tire during the vulcanizing operation.

In the operation of the apparatus just described the tire to be retreaded is buffed off in accordance with the usual practice and a mold best adapted to fit the particular size tire is selected by the operator from the molds in the shop. With the tire mounted upon its supporting rim and with the necessary air-bag or inner tube in the tire and with the retreading rubber on the tire, the mold 98 is placed about the uninflated tire and the clamping bolt 134 is swung into position and tightened to fasten the mold about the tire. Ordinarily in our preferred vulcanizing operation we do not materially tighten the bolt 138 and the relation of the parts is such that the tread portion of the tire is not circumferentially compressed during vulcanizing. The mold merely fits around the tire in snug relation and so as to form a somewhat flat but quite natural transverse curve in the tire carcass.

At this stage in the operation the side rings 116 are placed at the shoulders of the tire and fitted up into engagement with the ribs 118 of the sides 104 of the mold 98. It is important to position the side rings laterally so that they substantially confine the retreading rubber to the proper portions of the tire, and by the use of these rings it is possible to handle the same size tires worn to different degrees and also to take care of different size tires in exactly the same mold. Specifically, in a single mold in our retreading assembly we have found that very satisfactory results can be had in vulcanizing the following tire sizes,—19 x 5.50, 16 x 7.00, 16 x 7.50, 18 x 6.00, 14 x 8.00, 21 x 4.50, etc.

It will be recognized that the outside diameters of substantially all of the tires listed just above are within relatively close limits. However, the cross-sectional dimensions of the tires vary considerably and hence so does the width of their treads and the size of the means for surrounding the tire during retreading. In former practices it was necessary to employ a different size of mold for substantially every one of the tire sizes mentioned above. In certain instances it was possible to take care of several tire sizes in a single mold. However, it is the provision of adjustable side rings as herein disclosed which greatly increases the number of tire sizes which can be handled by a single mold.

The importance of this advance in the art will be appreciated when it is understood that in the prior art retreading shop it was necessary to have as many as fifty molds to handle the different sizes of tires which were retreaded. In our improved apparatus and process the number of molds is cut to from one-half to one-third of the number formerly required and thus the initial equipment cost as well as maintenance and repair is materially reduced with the attending advantages.

Likewise by the use of our adjustable side rings we are able to provide more uniform retreading of tires by the elimination of uneven cures, heavy spots, and by adapting the position of the side rings to take care of the same size tires where one has had wear clear down to the carcass and another merely to just remove the tread design.

Now assuming that the parts of the mold assembly are in the position they normally assume after a retreaded tire and mold have been removed, that is, with the outer plate 76 removed and with the shafts 32 and 70 in horizontal position, the tire T, rim R with the mold 98 mounted on the tire as above described are supported by suitable overhead means such as a chain block or, if sufficiently light, by the operator, and are slid onto the arms 50. With the latch 38 engaged in one of the slots 36 of the nut 34 so as to fix the shaft 32, the hand-wheel 60 is operated to rotate the screws 54 to thereby move the brackets 46 and associated arms 50 radially outward to pick up and center the mold 98, tire T, and rim R. The outer circular plate 76 is then swung into position while supported upon an overhead means and the shaft 70 is threaded into the hollow shaft 32, or the invention contemplates leaving the shaft 70 in the hollow shaft 32 and removing the handwheel 80 and thrust bearing 82 to permit removal of the outer plate 76. In all events, the outer plate 76 is tightened down against the tire by the rotation of the shaft 70 in the fixed shaft 32 which brings the water jackets 146 and 146a into engagement with the sides of the tire.

The tire is then inflated with about 25 pounds air pressure which operation together with the clamping action of the water jackets 146 and 146a brings the side rings 116 and the shoulders of the tire carcass into the proper relation. Bolts 88 are now dropped into the slots 86 and 86a and nuts 90 and 90a are brought down snug against the side plates 40 and 76 after the flats of the bolts 88 are held between the forked brackets 140 secured to the mold 98. To assist in handling the nuts of the bolts 88 the latch 38 may be swung out of the slots 36 so that the entire mold can be rotated in the hub 30. The tire is now inflated to approximately 90 to 110 pounds air pressure and after making certain that the mold and shoulder rings are fitting properly, by observation through the radial slots 44, 44a, 86 and 86a, the nuts 90 and 90a are tightened firmly against the side plates 40 and 76.

Preferably we vulcanize the new tread upon the tire carcass while it is held in a horizontal position. This reduces the head of plastic rubber in the mold and tends to make a more uniform and evenly balanced retread. To move our mold assembly from the vertical position in which it is illustrated in Fig. 2 to a horizontal vulcanizing position it is only necessary to operate handwheel 24 which through worm 16 and worm-gear 14 tips bracket 28 and hub 30 carrying shaft 32 into the horizontal position. The vulcanizing operation may under certain circumstances be performed in the vertical plane, and in this embodiment of the invention the tilting mechanism can be eliminated and the apparatus mounted upon a fixed base.

After the tire is inflated steam or other vulcanizing fluid is passed through the chamber 110 of the mold 98 the necessary time to effect vulcanization. At the same time water or other cooling fluid is circulated through the jackets 146 and 146a. The exact time required for vulcanization will, of course, depend upon the size of the tire and the amount and character of retreading material as well as the heat and pressure upon the rubber.

The process of removing the retreaded tire from the mold assembly is substantially the reverse of the assembling operation just described. The apparatus adapts itself to handle tires and associated molds of widely varying sizes, it being designed to take care of the largest bus and truck tire down to very small tires.

An important feature of our invention is the provision of an improved mold and method of making it with the mold being used in vulcanization of rubber tires. Prior to our invention it has been the usual practice to make tire molds of cast iron which is machined to provide the desired tread configuration. It has likewise been suggested to employ cast iron backing or base molds with die-cast inserts being secured in the base molds so that the base molds could be used over again if the tire design were changed. Cast and machined molds of other materials have also been employed, but in all tire vulcanizing operations with which we are familiar mold costs have been a very important feature in the production costs of the tire either originally or in retreading. This is because the molds are expensive to make in the manner described and since varying public demand and changes in tire design have necessitated such frequent scrapping of former tire shapes and tread designs.

We have discovered that a relatively inexpensive and yet highly efficient and satisfactory tire mold can be made by extruding aluminum under high pressures and while semi-plastic to form a tire tread mold of the desired contour with the extruded aluminum then being cut into sections and curved to form the vulcanizing mold. Specifically in Fig. 5 apparatus is illustrated which diagrammatically illustrates our process of manufacture, and in this figure of the drawings the numeral 160 indicates a cylinder having a die-head 162, a ram 164, a breech 166, and an associated conduit 168 for supplying fluid under high pressure to the cylinder behind the ram 164. The conduit 168 is connected by way of a valve 170 to an accumulator 172 for building up hydraulic pressure which is of standard design and will therefore not be described in detail.

The die-head 162 includes a die 174 having an opening 176 of a contour which results in an extruded mold of desired shape. Aluminum alloy 180 heated to a temperature below a fluid but to a plastic state is indicated by the numeral 180 and upon operation of the ram 164 is forced through the die 174 on the table 182.

As above described the aluminum as extruded from the die 174 is pulled out upon the table 182 and upon cooling and any heat treating is cut into the desired lengths for tire molds, bent into an endless circle and welded or otherwise secured together. The molds made in this manner, of course, can not have any design except one extending longitudinally, i. e., circumferentially of the mold. But the extruded sections can, of course, be machined with transverse slots so that many tread designs of attractive quality can be readily and inexpensively made by our improved process. While the mold of our invention is primarily adapted for use in retreading operations where it may be employed alone without heavy backing means, nevertheless it is likewise capable of use in conjunction with molds for vulcanizing any constructed tires in which case the extruded mold parts may be fastened to base or backing molds substantially of the same type as employed with die-cast inserts.

The resulting mold structure when used for retreading or new tire vulcanization is much less expensive than types heretofore employed, is light in weight, possesses excellent heat-transmitting qualities, and undeniably constitutes a direct advance in the art.

While in accordance with the patent statutes one embodiment of our retreading apparatus and one method of manufacturing our improved mold have been illustrated and described in detail, it should be appreciated that our invention is not limited thereto or thereby but is defined in the appended claims.

We claim:

1. A vulcanizer for retreading pneumatic tires comprising radially adjustable clamping means for supporting the tire through its rim, laterally adjustable side plates having associated water jackets for contacting with and supporting the tire sides, a mold surrounding the tread portion of the tire and releasably secured to the side plates, side rings associated with the mold substantially at the shoulders of the tread to be applied and extending approximately into contact with the tire carcass, means for mounting the side rings in any of a plurality of lateral positions relative to the mold whereby a plurality of tire sizes can be handled by one mold assembly, and means for moving the vulcanizer to and supporting it in horizontal or vertical position.

2. A vulcanizer for retreading pneumatic tires comprising radially adjustable clamping means for supporting the tire through its rim, laterally adjustable side plates having associated water jackets for contacting with and supporting the tire sides, a mold surrounding the tread portion of the tire and releasably secured to the side plates, side rings associated with the mold substantially at the shoulders of the tread to be applied and extending approximately into contact with the tire carcass, and means for mounting the side rings in any of a plurality of lateral positions relative to the mold whereby a plurality of tire sizes can be handled by one mold assembly.

3. A vulcanizer for retreading pneumatic tires comprising laterally adjustable side plates having associated water jackets for contacting with and supporting the tire sides, a mold surrounding the tread portion of the tire and releasably secured to the side plates, side rings associated with the mold substantially at the shoulders of the tread to be applied and extending approximately into contact with the tire carcass, and means for mounting the side rings in any of a plurality of lateral positions relative to the mold whereby a plurality of tire sizes can be handled by one mold assembly.

4. A vulcanizer for retreading pneumatic tires comprising laterally adjustable side plates for contacting with and supporting the tire sides, a mold surrounding the tread portion of the tire, side rings associated with the mold substantially at the shoulders of the tread to be applied and extending approximately into contact with the tire carcass, and means for mounting the side rings in any of a plurality of lateral positions relative to the mold whereby a plurality of tire sizes can be handled by one mold assembly.

5. A vulcanizer for retreading pneumatic tires comprising a mold surrounding the tread portion of the tire, side rings associated with the mold substantially at the shoulders of the tread to be applied and extending approximately into contact with the tire carcass, means for mounting the side rings in any of a plurality of lateral positions relative to the mold whereby a plurality of tire sizes can be handled by one mold assembly, and means other than the side rings for confining the side walls of the tire during the retreading operation.

6. That combination in a mold for retreading pneumatic tires comprising a circular mold of aluminum alloy having a transversely curved main tread-contacting portion formed with integral radially inwardly extending ribs forming circumferential grooves in the retread, said main mold portion having integral laterally extending side portions substantially parallel to the axis of the mold, side rings of aluminum alloy mounted on the side portions of the mold and defining the shoulders of the retread, and means for adjustably positioning the side rings on the side portions of the mold.

7. That combination in a mold for retreading pneumatic tires comprising a circular mold of aluminum alloy having a transversely curved main tread-contacting portion formed with integral radially inwardly extending ribs forming circumferential grooves in the retread, said main mold portion having integral laterally extending side portions substantially parallel to the axis of the mold, side rings of aluminum alloy mounted on the side portions of the mold and defining the sides of the retread, and means including ribs and channels for adjustably positioning the side rings on the side portions.

8. That combination in a mold for retreading pneumatic tires comprising a circular mold of aluminum alloy having a transversely curved main tread-contacting portion formed with integral radially inwardly extending ribs forming circumferential grooves in the retread, said main mold portion having integral laterally extending side portions substantially parallel to the axis of the mold, side rings of aluminum alloy mounted on the side portions of the mold, and means adjustably positioning the side rings on the side portions, and means other than the side rings for confining the side walls of the tire during the retreading operation.

9. That combination in a mold for retreading pneumatic tires comprising a circular mold having a transversely curved main tread-contacting portion formed with integral radially inwardly extending ribs forming circumferential grooves in the retread, said main mold portion having integral laterally extending side portions substantially parallel to the axis of the mold, side rings mounted on the side portions of the mold and engaging with the shoulders of the retread, means adjustably positioning the side rings on the side portions, and other means for supporting the side walls of the tire during the retreading operation.

10. That combination in a mold for retreading pneumatic tires comprising a circular mold having a main tread-contacting portion, said main mold portion having integral laterally extending side portions, side rings mounted on the side portions of the mold and engaging with the shoulders of the retread, means adjustably positioning the side rings on the side portions, and other means for supporting the side walls of the tire during the retreading operation.

11. That combination in a mold for retreading pneumatic tires comprising a circular mold of aluminum alloy having a transversely curved main tread-contacting portion formed with integral radially inwardly extending ribs forming circumferential grooves in the retread, said main mold portion having integral laterally extending side portions substantially parallel to the axis of the mold, side rings of aluminum alloy mounted on the side portions of the mold and defining the sides of the retread, means including ribs and channels for adjustably positioning the side rings on the side portions, and means associated with the mold for defining a chamber for the passage of heating fluid.

12. A vulcanizer for retreading pneumatic tires comprising radially adjustable clamping means for supporting the tire, laterally adjustable side plates for contacting with and supporting the tire sides, a mold surrounding the tread portion of the tire, side rings associated with the mold substantially at the shoulders of the tread to be applied and extending approximately into contact with the tire carcass, means for mounting the side rings in any of a plurality of lateral positions relative to the mold whereby a plurality of tire sizes can be handled by one mold assembly, and means for moving the vulcanizer to and supporting it in horizontal or vertical position.

EDWARD D. RIHN.
EDWARD D. ODENBAUGH, Jr.